United States Patent
Min et al.

(10) Patent No.: US 11,200,790 B2
(45) Date of Patent: Dec. 14, 2021

(54) METHOD FOR PRE-DETECTING ABNORMALITY SIGN OF NUCLEAR POWER PLANT DEVICE INCLUDING PROCESSOR FOR DETERMINING DEVICE IMPORTANCE AND WARNING VALIDITY, AND SYSTEM THEREFOR

(71) Applicant: KOREA HYDRO & NUCLEAR POWER CO., LTD, Gyeongsangbuk-do (KR)

(72) Inventors: Ji Ho Min, Daejeon (KR); Ji In Kim, Seoul (KR); Hooh Kwon Ha, Seoul (KR); Jeong Hag Oh, Ulsan (KR); Young Sheop Park, Sejong (KR); Chi Yong Park, Daejeon (KR); Dae Woong Kim, Sejong (KR); Yang Seok Kim, Daejeon (KR); Byoung Oh Lee, Daejeon (KR)

(73) Assignee: Korea Hydro & Nuclear Power Co., LTD., Gyeongsangbuk-do (KR)

( * ) Notice: Subject to any disclaimer, the term of this patent is extended or adjusted under 35 U.S.C. 154(b) by 376 days.

(21) Appl. No.: 16/328,627

(22) PCT Filed: Aug. 29, 2017

(86) PCT No.: PCT/KR2017/009429
§ 371 (c)(1),
(2) Date: Feb. 26, 2019

(87) PCT Pub. No.: WO2018/044040
PCT Pub. Date: Mar. 8, 2018

(65) Prior Publication Data
US 2021/0287515 A1     Sep. 16, 2021

(30) Foreign Application Priority Data

Aug. 29, 2016 (KR) .................. 10-2016-0110307
Aug. 29, 2016 (KR) .................. 10-2016-0110313

(51) Int. Cl.
*G08B 21/18* (2006.01)
*G08B 29/00* (2006.01)
(Continued)

(52) U.S. Cl.
CPC ............ *G08B 21/18* (2013.01); *G08B 21/02* (2013.01); *G08B 21/187* (2013.01); *G08B 29/00* (2013.01); *G21D 3/06* (2013.01)

(58) Field of Classification Search
CPC ...... G08B 21/18; G08B 21/02; G08B 21/187; G08B 29/00; G21D 3/06
See application file for complete search history.

(56) References Cited

U.S. PATENT DOCUMENTS 7,096,074 B2 * 8/2006 Yulevitch ............ G06K 9/6284
700/21
7,181,654 B2 * 2/2007 Ford, Jr. ............. G05B 23/024
340/517

(Continued)

FOREIGN PATENT DOCUMENTS

CN       102460529 A     5/2012
CN       103336199 A    10/2013
(Continued)

OTHER PUBLICATIONS

Chinese Office Action dated Nov. 19, 2020 in CN Application No. 201780053355.9.
(Continued)

*Primary Examiner* — Toan N Pham
(74) *Attorney, Agent, or Firm* — Occhiuti & Rohlicek LLP (57) ABSTRACT

The present invention provides a method for early warning of an abnormality sign of a device, which includes device importance and warning validity determination, and a system therefor. The method for early warning of the abnor-
(Continued)

mality sign of the device comprises: a first step of determining by an early warning processing apparatus whether a device monitoring signal value exceeds a normal operation range by using a weight value on the basis of monitoring-parameter-specific importance data which has been previously analyzed by an operator; a second step of generating a warning by the early warning processing apparatus when the device monitoring signal value exceeds the normal operation range; and a third step of determining by a warning determination apparatus whether the generated warning is a valid warning, which is subject to a warning analysis and to be traced.

20 Claims, 9 Drawing Sheets (51) Int. Cl.
G21D 3/06 (2006.01)
G08B 21/02 (2006.01)

(56) References Cited

U.S. PATENT DOCUMENTS

| | | | |
|---|---|---|---|
| 2012/0136629 A1 | 5/2012 | Tamaki et al. | |
| 2012/0271826 A1 | 10/2012 | Kim | |
| 2012/0330631 A1* | 12/2012 | Emigholz | G05B 13/048 703/2 |
| 2013/0073260 A1 | 3/2013 | Maeda et al. | |
| 2016/0189533 A1 | 6/2016 | Modi et al. | |

FOREIGN PATENT DOCUMENTS

| | | |
|---|---|---|
| CN | 103824129 A | 5/2014 |
| CN | 104724098 A | 6/2015 |
| CN | 104730458 A | 6/2015 |
| CN | 105068529 A | 11/2015 |
| CN | 105389406 A | 3/2016 |
| JP | 05157668 | 6/1993 |
| JP | H064789 A | 1/1994 |
| JP | 09145553 | 6/1997 |
| JP | 2000029513 | 1/2000 |
| KR | 101065767 | 9/2011 |
| KR | 101543636 | 8/2015 |
| KR | 101615085 | 4/2016 |
| KR | 101615085 B1 | 4/2016 |

OTHER PUBLICATIONS

European Search Report dated Jun. 10, 2020 in EP Application No. 17846965.6.

* cited by examiner

METHOD FOR PRE-DETECTING ABNORMALITY SIGN OF NUCLEAR POWER PLANT DEVICE INCLUDING PROCESSOR FOR DETERMINING DEVICE IMPORTANCE AND WARNING VALIDITY, AND SYSTEM THEREFOR

CROSS REFERENCE TO RELATED APPLICATIONS

This application is a National Phase under 35 U.S.C. 371 of International Application No. PCT/KR2017/009429 filed on Aug. 29, 2017, which claims priority to Korean Application No. 10-2016-0110313 filed on Aug. 29, 2016 and Korean Application No. 10-2016-0110307 filed on Aug. 29, 2016.

TECHNICAL FIELD

The present invention relates to waning a device abnormality sign and, more particularly, to generation of warning by determining a device abnormality sign in a power plant and pre-detection of abnormality signs of devices in a nuclear power plant.

BACKGROUND ART

Conventionally, in order to generate a warning by determining abnormality of a device in a power plant, waning data such as temperature, pressure, and the like is acquired from a measuring instrument, a current value and a prediction value of the data are compared, and accordingly, abnormality of a device is determined and early warning is generated. The early warning system currently used is implemented with the principle that a difference between a current value of a device monitoring variable and a prediction value computed by an early warning program is represented as a residual, and when the residual passes a normal operation range of the device monitoring variable, a warning is generated.

Figure 1:
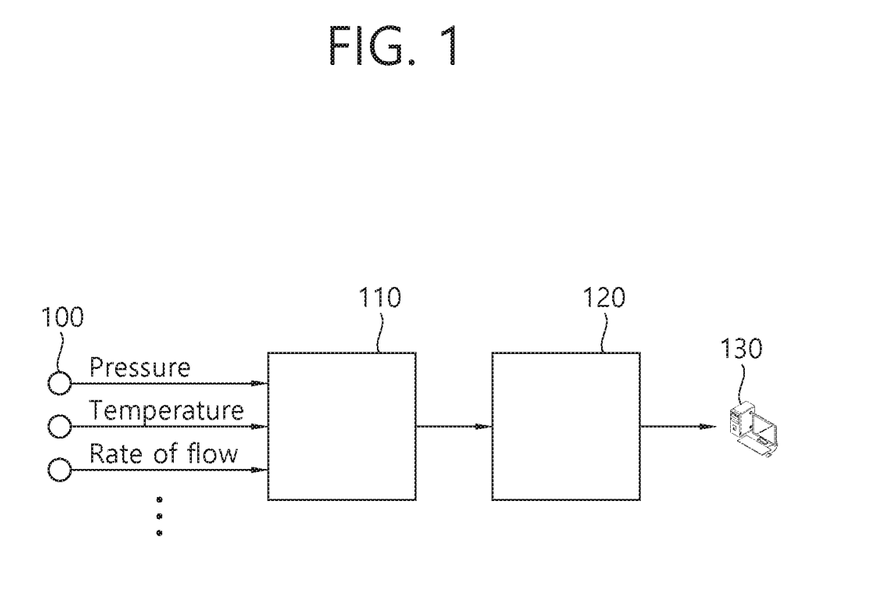
FIG. 1 is a block diagram illustrating the conventional early warning system.

FIG. 1 is a block diagram illustrating the conventional early warning system. Referring to FIG. 1, the conventional early warning system includes a measuring instrument 100 for measuring states of power plant machines, a data processing device 110 for receiving and storing monitoring signals (e.g., pressure, temperature, rate of flow, etc.) obtained from the measuring instruments 100 and converting them to digital data, an early warning processing device 120 for generating an early warning by analyzing the converted data, and an operator monitor 130 for an operator to check the device sate, early warning state, and the like.

Figure 2:
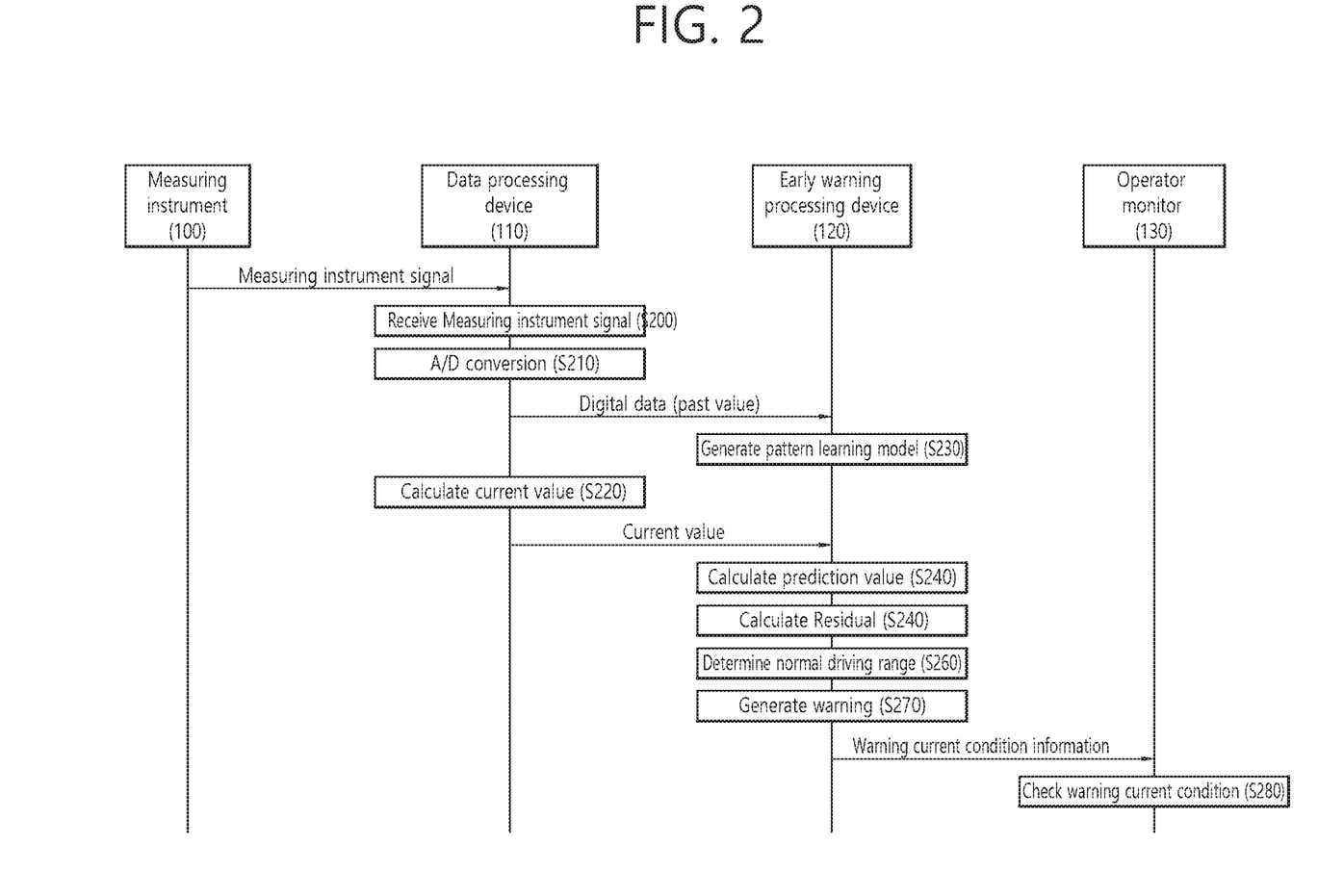
FIG. 2 is a flowchart illustrating the conventional early warning system.

FIG. 2 is a flowchart illustrating the conventional early warning system. As shown in FIG. 2, the data processing device 110 receives measuring instrument signals from the measuring instruments (step, S200).

The received measuring instrument signals are analogue signals, and the analogue signals are converted to digital data by going through data processing step (step, S210).

Then, the data processing device 110 calculates current values of the measuring instrument signals in real time (step, S220).

The early warning processing device 120 receives past measuring instrument signals during a predetermined period going through the data processing step from the data processing device 110, and generates a pattern learning model in advance (step, S230).

The calculated current values are transmitted to the early warning processing device 120, and the early warning processing device 120 calculates prediction values by using the pattern learning model generated in advance (step, S240).

Residuals (i.e., |current value−prediction value|) are calculated by using the current values and the prediction values (step, S250).

The residuals are compared with a normal operation range of each of the preconfigured monitoring variables (e.g., temperature, pressure, rate of flow, etc.) (step, S260). In the case that the residual passes the normal operation range, a warning is generated (step, S270), and in the case that the residual does not pass the normal operation range, a warning is not generated. At this time, the normal operation range for generating a warning may be adjusted by an operator.

The early warning processing device 120 transmits warning current condition information to the operator monitor 130 such that the operator may check the warning current condition (step, S280).

However, such an early warning system has the following problems.

In a power plant, the number of monitoring target devices reaches a few hundreds, and the number of monitoring variables reaches 1000 to 2000 per unit. Accordingly, in the case that a warning is generated in such a way, the warning is generated very frequently, and many times consumed for an operator to check and analyze the warning.

In addition, since device importance is not considered, there is a problem that an operator needs to determine importance of a warning one by one when the warning is generated.

Furthermore, after a warning is generated, it is unable to distinguish whether the warning is a warning generated by abnormality sign of an actual device or a waning generated by a device replacement operation scheduled in advance or experiment, maintenance, and the like. Accordingly, there is a problem that an operator analyzes a warning whenever the warning is generated, and determines validity of the warning.

Therefore, a warning should be generated only in abnormal state of an actual device in advance, and accordingly, it is required for an operator to operate an early warning system efficiently.

Figure 5A:
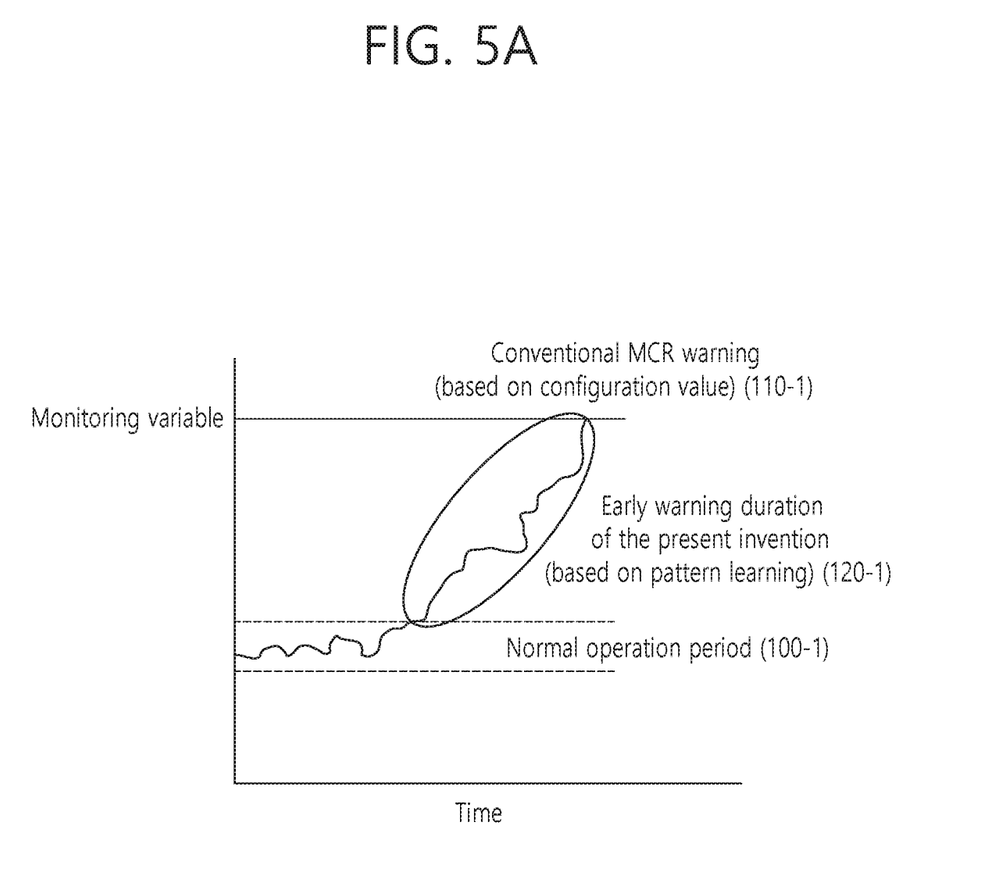
FIG. 5a is a diagram illustrating an early warning generation range of the conventional method and the example embodiment of the present invention.

In the conventional abnormality sign detection system of devices in a nuclear power plant, as shown in FIG. 5a, in the case that a variable for monitoring devices exceeds a normal operation range, and the exceeding value reaches a preconfigured set point, a warning is generated.

Figure 5B:
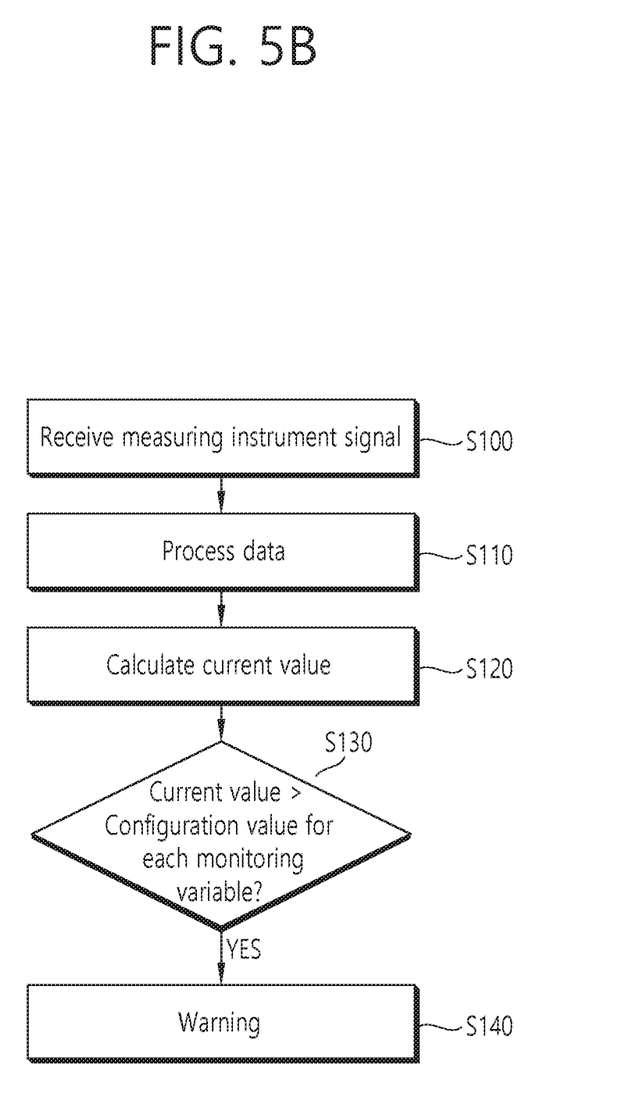
FIG. 5b is a flowchart of the conventional warning method.

FIG. 5b is a flowchart of the conventional warning method. Referring to FIG. 5b, the conventional warning method includes receiving a measuring instrument signal (step, S100) by a data processing device, and progressing a data processing procedure of converting the received measuring instrument signal to a digital signal (step, S110). And then, the method includes calculating a current value in a predetermined time interval (step, S120), and determining the current value calculated in the early warning processing device exceeds a configured value for each monitoring variable (step, S130). As a result of the determination, in the case that the current value exceeds the configured value for each monitoring variable, a warning is generated (step, S140).

In the case of the conventional warning method as described above, a nuclear power plant operator is hard to know the abnormal state from a normal operation period 100 to a configuration value arrival period 110. In addition, a device breaks down abruptly in a transient state period 120 or an accident that causes a power plant shut down is progressed, and therefore, an efficient pre-monitoring means is required between the normal operation period and the configuration value arrival period.

DISCLOSURE

Technical Problem

An object of the present invention is to provide a method and system for adjusting a warning generation frequency depending on an importance of a device, and early warning of a device abnormality sign including a determination of device importance and warning validity provided to an operator by distinguishing a warning in which trace and analysis are required from a warning in which trace and analysis are not required for the generated warning.

An object of the present invention is to provide a method and system for pre-detecting a device abnormality sign for pre-detecting a minute abnormality sign of devices in order to prevent breakdown of nuclear power plant main devices and minimizing device breakdown and abrupt shut down of the nuclear power plant by generating an early warning.

Technical Solution

According to an aspect of the present invention, the present invention provides a method for early warning of an abnormality sign of a device, which includes device importance and warning validity determination. The method for early warning of an abnormality sign of a device includes a first step of determining, by an early warning processing device, whether a device monitoring signal value exceeds a normal operation range by using a weight value based on importance data for each monitoring variable which has been previously analyzed by an operator, a second step of generating a warning, by the early warning processing device, when the device monitoring signal value exceeds the normal operation range, and a third step of determining, by a warning determination device, whether the generated warning is a valid warning, which is subject to a warning analysis and to be traced.

The first step may include performing analogue-digital conversion, by a data processing device, of the monitoring signals received from measurement instruments, and calculating a current value of the monitoring signals and transmitting the current value to the early warning processing device and an importance categorizing device in a predetermined time interval.

The first step may further include searching, by the importance categorizing device, an importance grade and a weight value of the monitoring variable to which the transmitted current value corresponds in an importance database, and transmitting the importance grade and the weight value to the early warning processing device.

The first step may further include calculating, by the early warning processing device, a residual by using the transmitted current value, the weight value and a preconfigured pattern learning model.

The first step may further include determining, by the early warning processing device, whether the residual passes the normal operation range which is preconfigured by an operator.

The third step may include receiving, by the warning determination device, current state information of the warning and categorizing the current state information into an announced warning and an warning be analyzed.

The announced warning may correspond to at least one of a warning generated by power plant main control room, a warning generated by a device replacement operation, and a warning generated by an experiment or a maintenance scheduled in advance.

If the warning is the warning be analyzed, when it is determined that the power plant maintenance is required as a result of the warning analysis and trace by the operator, wherein the warning determination device may notice the generation of warning to at least one of a power plant operator computer and a power plant operator personal wireless communication device.

According to another aspect of the present invention, the present invention provides a system for early warning of an abnormality sign of a device, which includes device importance and warning validity determination. The system for early warning of an abnormality sign of a device includes an early warning processing device for determining whether a device monitoring signal value exceeds a normal operation range by using a weight value based on importance data for each monitoring variable which has been previously analyzed by an operator, and generating a warning when the device monitoring signal value exceeds the normal operation range, and a warning determination device for determining whether the generated warning is a valid warning, which is an object to be subject to a warning analysis and to be traced.

The system for early warning of an abnormality sign of a device may further include a data processing device for performing analogue-digital conversion of the monitoring signals received from measurement instruments, and calculating a current value of the monitoring signals and transmitting the current value to the early warning processing device and an importance categorizing device in a predetermined time interval.

The system for early warning of an abnormality sign of a device may further include the importance categorizing device for searching an importance grade and a weight value of the monitoring variable to which the transmitted current value corresponds in an importance database, and transmitting the importance grade and the weight value to the early warning processing device.

The early warning processing device may calculate a residual by using the transmitted current value, the weight value and a preconfigured pattern learning model.

The early warning processing device may determine whether the residual passes the normal operation range which is preconfigured by an operator.

The warning determination device may receive current state information of the warning and categorizes the current state information into an announced warning and an warning be analyzed.

The announced warning may correspond to at least one of a warning generated by power plant main control room, a warning generated by a device replacement operation, and a warning generated by an experiment or a maintenance scheduled in advance.

If the warning is the warning be analyzed, when it is determined that the power plant maintenance is required as a result of the warning analysis and trace by the operator, wherein the warning determination device may notice the generation of warning to at least one of a power plant operator computer and a power plant operator personal wireless communication device.

According to another aspect of the present invention, the present invention provides a method for early detection of an abnormality sign of a device, which includes device importance and warning validity determination. The method for early detection of an abnormality sign of a device includes performing, by a pattern learning device, a pattern learning by using past device monitoring data of a predetermined period and grouping monitoring variables showing a similar pattern for a same device, and generating, by a prediction value calculation device, a prediction value of a current monitoring data received in real time by using patterns of the grouped monitoring variables.

The step of grouping monitoring variables may include a first step of grouping the monitoring variables for each of same devices, and a second step of grouping the grouped monitoring variables for each of the same devices showing the similar pattern.

The step of generating a prediction value may calculate a prediction value by comparing the current monitoring data with a pattern learning value of the similar monitoring variable group belonged to the same device and providing high weight value as the values are similar.

The past device monitoring data and the current monitoring data may be digital data going through analogue-digital conversion.

The past device monitoring data and the current monitoring data may be data related to early warning subject monitoring variable which is predetermined by an operator.

The method for early detection of an abnormality sign of a device may further include generating, by an early warning processing device, an early warning by obtaining a residual using an absolute value of a difference between the prediction value and the current data, when the residual is greater than a normal operation range residual.

The normal operation range residual may be stored in database, which is designated in advance for each monitoring variable by an operator.

According to another aspect of the present invention, the present invention provides a system for early detection of an abnormality sign of a device, which includes device importance and warning validity determination. The system for early detection of an abnormality sign of a device includes a pattern learning device for a pattern learning by using past device monitoring data of a predetermined period and grouping monitoring variables showing a similar pattern for a same device, and a prediction value calculation device for generating a prediction value of a current monitoring data received in real time by using patterns of the grouped monitoring variables.

The grouping monitoring variables may include a first step of grouping the monitoring variables for each of same devices, and a second step of grouping the grouped monitoring variables for each of the same devices showing the similar pattern.

The generating a prediction value may calculate a prediction value by comparing the current monitoring data with a pattern learning value of the similar monitoring variable group belonged to the same device and providing high weight value as the values are similar.

The past device monitoring data and the current monitoring data may be digital data going through analogue-digital conversion.

The past device monitoring data and the current monitoring data may be data related to early warning subject monitoring variable which is predetermined by an operator.

The system for early detection of an abnormality sign of a device may further include an early warning processing device for generating an early warning by obtaining a residual using an absolute value of a difference between the prediction value and the current data, when the residual is greater than a normal operation range residual.

The normal operation range residual may be stored in database, which is designated in advance for each monitoring variable by an operator.

Advantageous Effects

The method and system for early warning a device abnormality sign including determination of device importance and warning validity according to the example embodiment of the present invention may minimize manpower needs for early warning analysis by decreasing warning generation frequency for devices of which importance is low, detect even for small changes for devices of which importance is high, and generate warning, thereby being utilized efficiently for preventing device and power plant shut down.

In addition, the generated warning is distinguished by a warning in which trace and analysis are required from a warning in which trace and analysis are not required, an early warning system of multiple units may be operated efficiently only with a small man power.

According to the conventional configuration value based warning method, even a minute abnormality occurs in a device, a warning is generated only if the abnormality reaches a configuration value of preconfigured monitoring variable, and then, an operator only recognizes this. Since most of monitoring variables have significant differences between a normal operation range and a configuration value range, a warning is not generated when a minute abnormality occurs in a device, and it is hard for an operator to notice the minute abnormality. In addition, in the case that such a minute abnormality of the device is accumulated, this may lead to a serious breakdown problem.

According to the method and system for early detection of a device abnormality sign according to the example embodiment of the present invention, a residual is calculated by using a prediction value which is calculated in real time by a pattern learning model, and when a size of the residual passes a normal operation deviation range, a warning is generated immediately, and accordingly, a minute sign of a device may be detected in advance.

In addition, a breakdown sign of nuclear power plant devices are detected promptly, and it may be prevented that the breakdown sign leads to breakdown of a device. Accordingly, an abrupt shut down of power plant can be minimized, and scheduled maintenance can be performed by predicting a breakdown of a device in advance, which contributes to save maintenance cost.

MODE FOR INVENTION

The present invention may have various modifications and various embodiments and specific embodiments will be illustrated in the drawings and described in detail in the detailed description. However, this does not limit the present invention to specific embodiments, and it should be understood that the present invention covers all the modifications, equivalents and replacements included within the idea and technical scope of the present invention.

Terms including as first, second, and the like are used for describing various constituent elements, but the constituent elements are not limited by the terms. The terms are used only to discriminate one constituent element from another component. For example, a first component may be referred to as a second component, and similarly, the second component may be referred to as the first component without departing from the scope of the present invention. A term 'and/or' includes a combination of a plurality of associated disclosed items or any item of the plurality of associated disclosed items.

When it is described that a component is "connected to" or "accesses" another component, the component may be directly connected to or access the other component or a third component may be present there between. In contrast, it should be understood that, when it is described that an element is "directly connected to" or "directly access" another element, it is understood that no element is present between the element and another element.

Terms used in the present application are used only to describe specific embodiments, and are not intended to limit the present invention. A singular form may include a plural form if there is no clearly opposite meaning in the context. In the present application, it should be understood that term "include" or "have" indicates that a feature, a number, a step, an operation, a component, a part or the combination thereof described in the specification is present, but does not exclude a possibility of presence or addition of one or more other features, numbers, steps, operations, components, parts or combinations thereof in advance.

Unless it is contrarily defined, all terms used herein including technological or scientific terms have the same meanings as those generally understood by a person with ordinary skill in the art. Terms which are defined in a generally used dictionary should be interpreted to have the same meaning as the meaning in the context of the related art, and are not interpreted as an ideal meaning or excessively formal meanings unless clearly defined in the present application.

Hereinafter, preferred embodiments of the present invention will be described in detail with reference to the accompanying drawings and in describing the preferred embodiments with reference to the accompanying drawings, the same reference numeral will refer to the same or corresponding component regardless of the reference numeral and a duplicated description thereof will be omitted.

Figure 3:
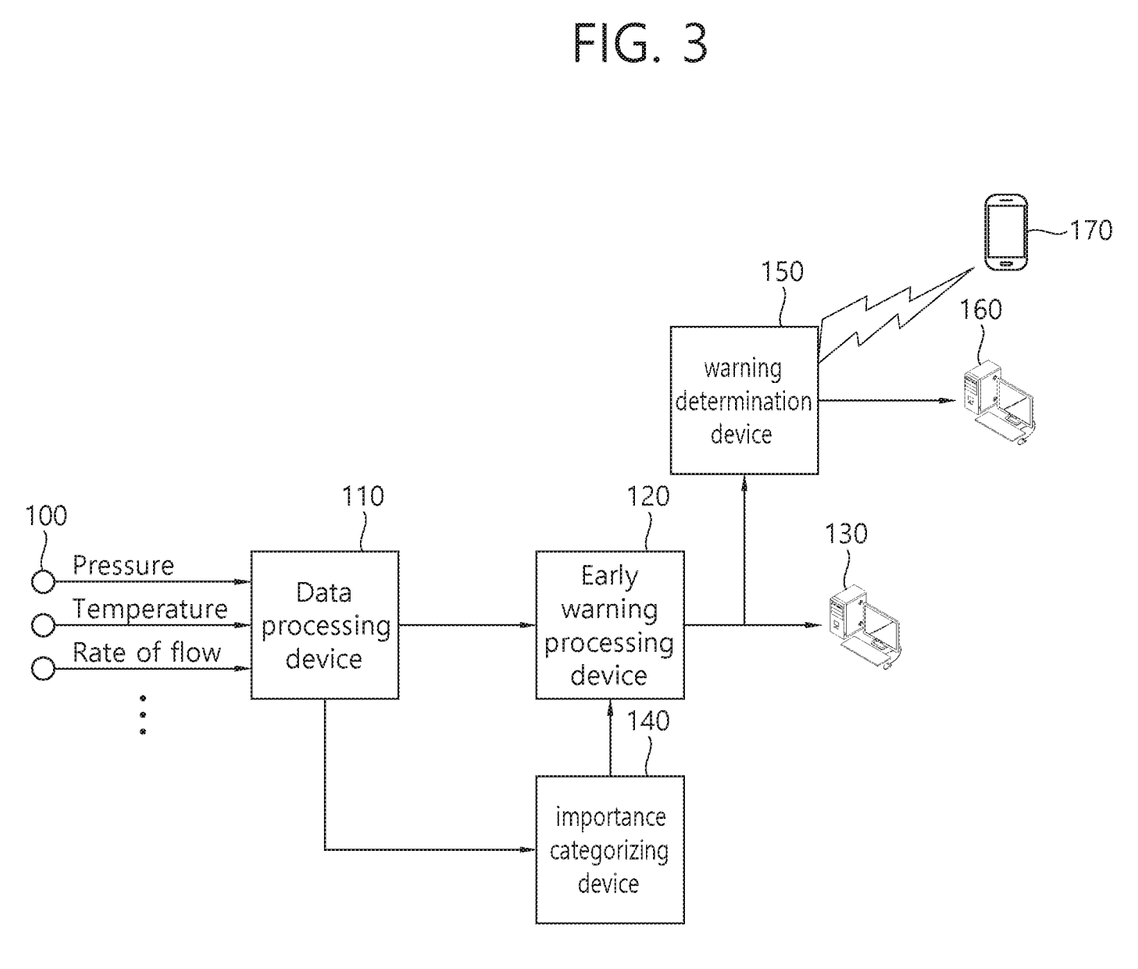
FIG. 3 is a block diagram illustrating an early warning system according to an embodiment of the present invention.

FIG. 3 is a block diagram illustrating an early warning system according to an embodiment of the present invention. Referring to FIG. 3, the early warning system of the example embodiment of the present invention includes a measuring instrument 100 for measuring states of power plant machines, a data processing device 110 for receiving and storing monitoring signals (e.g., pressure, temperature, rate of flow, etc.) obtained from the measuring instruments 100 and converting them to digital data, an early warning processing device 120 for generating an early warning by analyzing the converted data and using importance for each monitoring signal, an importance categorizing device 140 for storing importance for each monitoring signal data analyzed in advance and categorizing the collected monitoring signals according to the importance, a warning determination device 150 for determining a validity of warning when the warning is generated, an integrated center operator computer 130 for receiving and inquiring the device state and early warning state by an operator of an integrated center, a power plant operator computer 160 for receiving warning current state only in the case of valid warning, and a power plant operator personal wireless communication device 170.

The measuring instrument 100 is attached to power plant devices and therearound, and measures states of the devices (e.g., pressure, temperature, rate of flow, etc.), and transmits the monitoring data to the data processing device 110 in wired manner. An operator may transmit the data with a predetermined transmission interval (e.g., 1 second interval).

The data processing device 110 includes an analogue-digital converter, and converts the analogue monitoring data received from the measuring instrument 100 to digital monitoring data. The digital monitoring data is transmitted to the early warning processing device 120 and the importance categorizing device 140 through a wired communication link.

The early warning processing device 120 generates a pattern learning model by using the past monitoring data of a predetermined period (e.g., 18 months) which is transmitted. In addition, the early warning processing device 120 determines a normal operation condition and generates a warning by comparing a transmitted current monitoring data value with a prediction value of the previously generated pattern learning model.

The importance categorizing device 140 includes an importance database.

All monitoring variables of devices which are operating in a nuclear power plant are stored in the importance database, and information in which importance for each monitoring variable is categorized is stored according to an importance categorizing criterion designated by an operator in advance.

For example, the information may be stored with being categorized into three types for each monitoring variable including a variable (grade A) that influences on a power plant shutdown, a variable (grade B) that influences on a single device shutdown but not on a power plant shutdown and a variable (grade C) that does not influence on a device shutdown.

For example, a water supply pump bearing temperature is a variable that may cause a water supply pump shutdown when it rises abruptly and may be categorized as grade B, and a turbine bearing vibration is a variable that may cause a power plant shutdown when the vibration increases and may be categorized as grade A.

In addition, in the importance database, each weight value for each grade designated by an operator which will be used for calculating a prediction value is stored. For example, each weight value for each grade may be designated as 1.2 to 1.5 for grade A, 0.9 to 1.1 for grade B and 0.6 to 0.8 for grade C.

When the weight value is designated as such, there is an effect that a residual (|current value−prediction value|) may become greater for a monitoring variable of which importance is high, and a warning is generated even for a small change. Accordingly, for an importance monitoring variable, even a minute change may be detected.

There is an effect that a residual becomes much smaller for a monitoring variable of which importance is low, and a warning is generated only in the case of great change, and accordingly, a warning frequency may be decreased significantly.

The importance grade and each weight value for grade may be determined arbitrarily by an operator based on contents described in all types of operation procedure documents and an operation experience of the operator.

The importance categorizing device 140 determines an importance of the monitoring data transmitted from the data processing device 110 based on the importance data stored in the importance database.

The warning determination device 150 automatically transmits a warning current state to the power plant operator computer 160 and the power plant operator personal wireless communication device 170 when it is determined that a generated warning is valid warning in which a notification to a power plant and an action are required. The valid warning determination is determined on whether the same warning is generated even in a power plant main control room (MCR) (i.e., the case that a warning data value reaches a predetermined configuration value and a warning is generated), whether the warning is generated by a device replacement operation, whether the warning is generated by an experiment or a maintenance scheduled in advance, and only the warning that does not correspond to such a case is determined to be a valid warning.

Figure 4:
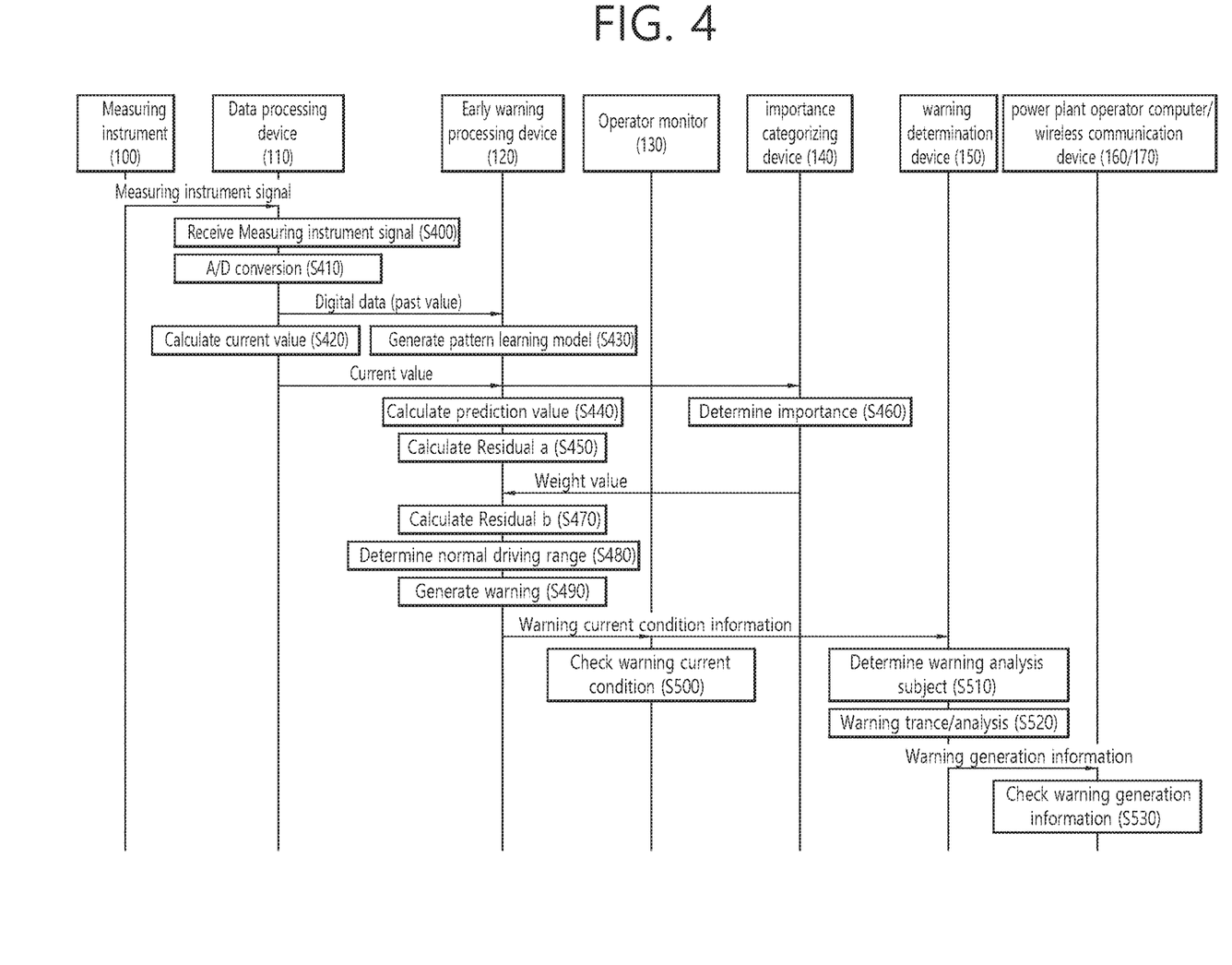
FIG. 4 is a flowchart illustrating an early warning method according to an embodiment of the present invention.

FIG. 4 is a flowchart illustrating an early warning method according to an embodiment of the present invention. Referring to FIG. 4, the data processing device 110 receives measuring instrument signals from the measuring instruments (step, S400).

Since the received measuring instrument signals are analogue signals, the measuring instrument signals pass through analogue-digital conversion step of being converted to digital data (step, S410). The converted digital data is transmitted to the early warning processing device 120.

Then, the data processing device 110 calculates current values of the measuring instrument signals (step, S520) in a predetermined time interval (e.g., 1 second interval), and transmits the current values to the early warning processing device 120 and the importance categorizing device 140.

The importance categorizing device 140 determines an importance of the current value which is transmitted from the data processing device 110 (step, S460). The importance determination is performed by searching an importance grade and a weight value of a monitoring variable to which the current value corresponds and a value stored in the importance database of the importance categorizing device 140. For example, in the case that the transmitted current value corresponds to water supply pump bearing temperature data, an importance grade and a weight value of the water supply pump bearing temperature stored in the importance database is searched.

The early warning processing device 120 generates a pattern learning model by using past monitoring data of a predetermined period (e.g., 18 months) going through the analogue-digital conversion step (step, S410) transmitted from the data processing device 110 (step, S430).

The early warning processing device 120 generates prediction values by using the transmitted current values and the pattern learning model which is generated in advance (step, S440). That is, the early warning processing device 120 compares the current value and the learning value of the pattern learning model in a predetermined time interval (e.g., 1 second interval) and finds a similar pattern, and then, calculates a prediction value.

Next, residual a (i.e., |current value−prediction value|) is calculated by using the current values and the prediction values (step, S450).

Residual b (weight value×residual a) is calculated by using the calculated residual a and the weight value corresponding to an importance of the monitoring variable determined in the importance categorizing device 140 (step, S470). In the early warning processing device 120, the function of calculating residual a in real time and finding a weight value of the same monitoring variable from the importance categorizing device 140 is included, and residual b may be calculated in real time.

The calculated residual b is compared with a normal operation range of each monitoring variable which is pre-configured (step, S480).

A warning is generated when residual b passes the normal operation range (step, S490), and a warning is not generated when residual b does not pass the normal operation range.

At this time, the normal operation range for generating a warning may be adjusted by an operator. For example, the normal operation range of the water supply pump is 45 (minimum) to 55 (maximum), and a deviation between the minimum value and the maximum value is 10. In the case that it is programmed that a warning is generated when a residual exceeds [maximum value−minimum value] deviation 10 of the normal operation range by 30% (±3), when an input current value is 60 and a calculated prediction value is 52, a residual is 8, which exceeds 30% of the deviation, a warning is generated. On the other hand, when a current value is 43 and a prediction is 45, a residual is 2, and a warning is not generated.

When a warning is generated, the early warning processing device 120 transmits warning current state information to the integrated center operator monitor 130 that monitors the entire power plants such that an operator may check (step, S500). Simultaneously, the early warning processing device 120 transmits the warning current state information to the warning determination device 150.

The warning determination device 150 receives the warning current state information and performs a validity determination process of the warning.

First, the warning determination device 150 categorizes a type of the received warning and determines an analysis target (step, S510).

For example, the warning determination device 150 determines whether the generated warning is also generated even in a power plant main control room (MCR), whether the warning is generated by a device replacement operation, whether the warning is generated by an experiment or a maintenance scheduled in advance, and in the case that the warning corresponds to any one of these, the warning is stored in an announced warning list, and the warning which does not correspond to any of these, the warning is stored in a list of warning(s) to be analyzed.

An integrated center operator warning-trances/analyzes the information stored in the list of warning(s) to be analyzed (step, S520). As a result, if it is determined that power plant maintenance is required, the fact that the warning is generated is noticed to the power plant operator computer 160 and the personal wireless communication device 170 of a power plant operator (or a person in charge of the device) which is designated in advance (step, S530). If it is determined that power plant maintenance is not required, a tendency is persistently monitored and an additional analysis is performed if it is required.

So far, various embodiments of the present invention are described. However, it is understood that the description is just for illustration and not to limit the scope of the present invention defined by the scope of the following claims. Accordingly, other embodiments are also within the scope of the following claims. For example, various modifications may be performed without departing from the scope of the present invention. Additionally, a part of the steps described above are independent from the order, and may be performed in different order from those of described above.

Figure 6:
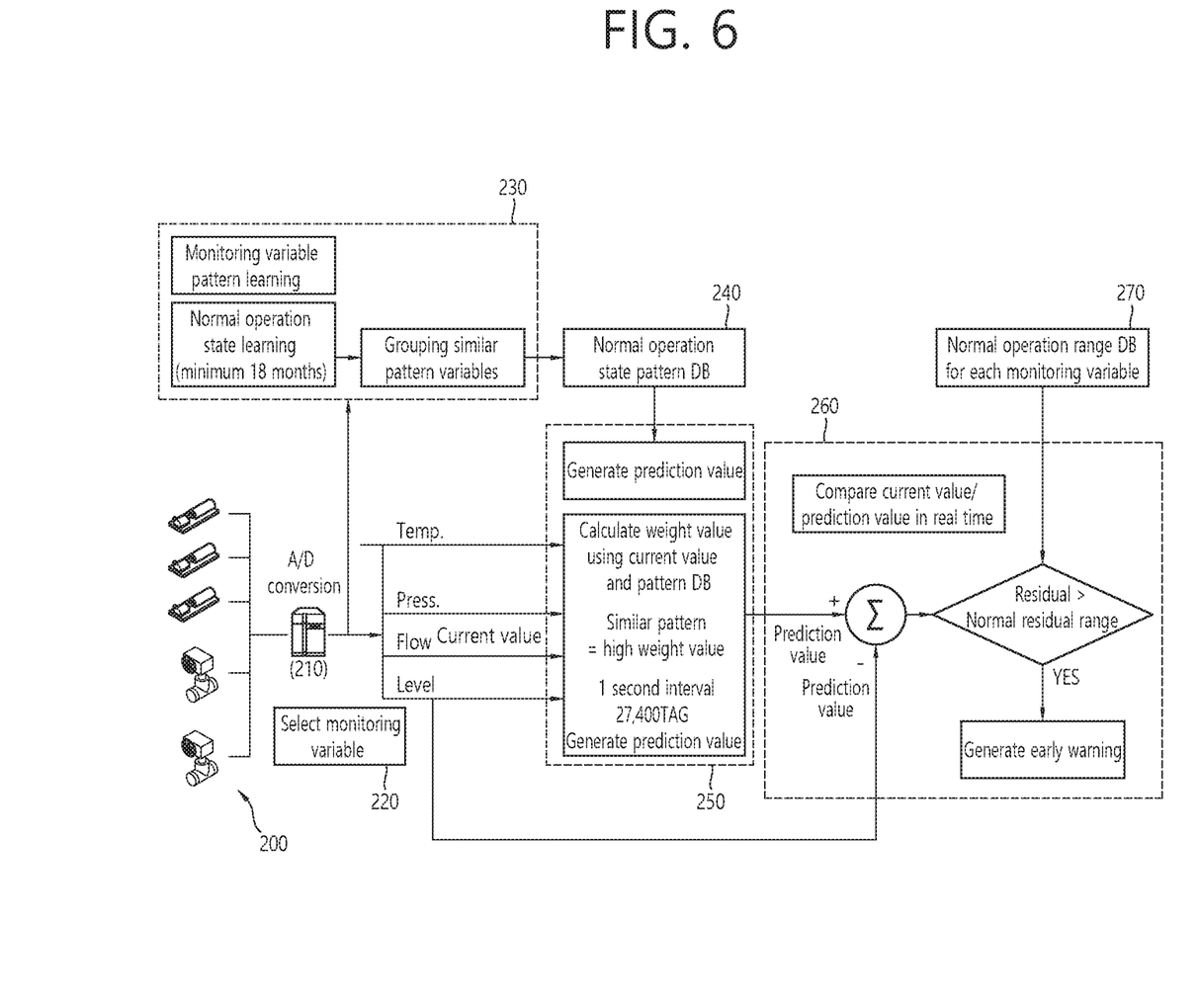
FIG. 6 is a diagram illustrating an early warning system according to an embodiment of the present invention.

FIG. 6 is a diagram illustrating an early warning system according to an embodiment of the present invention. Referring to FIG. 6, an early warning system includes measuring instruments 200 of power plant devices, a data processing device 210 for processing monitoring signals acquired from the measuring instruments, a monitoring variable selection/ storage device 220 for selecting and storing early warning application subject monitoring variables, a monitoring variable pattern learning device 230 for learning a normal operation history during a predetermined period (e.g., 18 months) for the selected monitoring variable, a pattern database 240 for storing monitoring variables in which monitoring variables of a similar pattern are grouped, a prediction value calculation device 250 for calculating a prediction value using a current value which is transmitted from the data processing device 210 in real time, a early warning processing device 260 for determining whether to generate a warning by comparing the current value and the prediction value and a normal operation range database 270 for storing a normal operation range for each monitoring variable.

The data processing device 210 collects and stores the monitoring signals (e.g., temperature, pressure, rate of flow, etc.) acquired from the measuring instruments 200 of the power plant devices, and converts the signals into digital data.

The monitoring variable selection/storage device 220 selects and databases the early warning application subject monitoring variables. The number of monitoring variables collected in the data processing device 210 in the power plant is about 7,000 to 10,000, and the monitoring variable selection/storage device 220 selects the monitoring variables that may be utilized usefully for early warning among these, and stores the monitoring variables. The selection is targeted to variables for which an early warning is available through a pattern recognition such as monitoring variables (e.g., temperature, pressure, rate of flow, vibration, etc.) of active components (e.g., pump, valve, turbine, generator, etc.) mainly, and important variables (e.g., power plant generation power, radioactive concentration, etc.) that may assess an operation state of the power plant, which are not an active component However, it is excluded on/off signals generated instantaneously or monitoring variables of devices that slightly influences power plant safety and operation. This is because processing and transmission of data in real time (unit of 1 second) becomes difficult when too many data are processed.

In the monitoring variable pattern learning device 230, a normal operation history of past one year or more (e.g., 18 months) of the selected variables is learned. With respect to the selected monitoring variables (about 1,300 for each power plant), normal operation state values (i.e., past operation values) of a predetermined period (e.g., 18 months which is one cycle operation period of a nuclear power plant) are collected, and pattern learning is performed. That is, when the normal operation history is learned by collecting values in the normal operation state during a predetermined period for each monitoring variables, the normal operation pattern of the corresponding variables may be completely learned. Each of the variables may have various operation patterns during the predetermined period, and all of such patterns are learned.

The monitoring variables showing a similar pattern may be grouped for the learned patterns and it can be said that the monitoring variables belonged to the same group may have a similar operation pattern. The grouped monitoring variables are stored in the pattern database 240.

Figure 7:
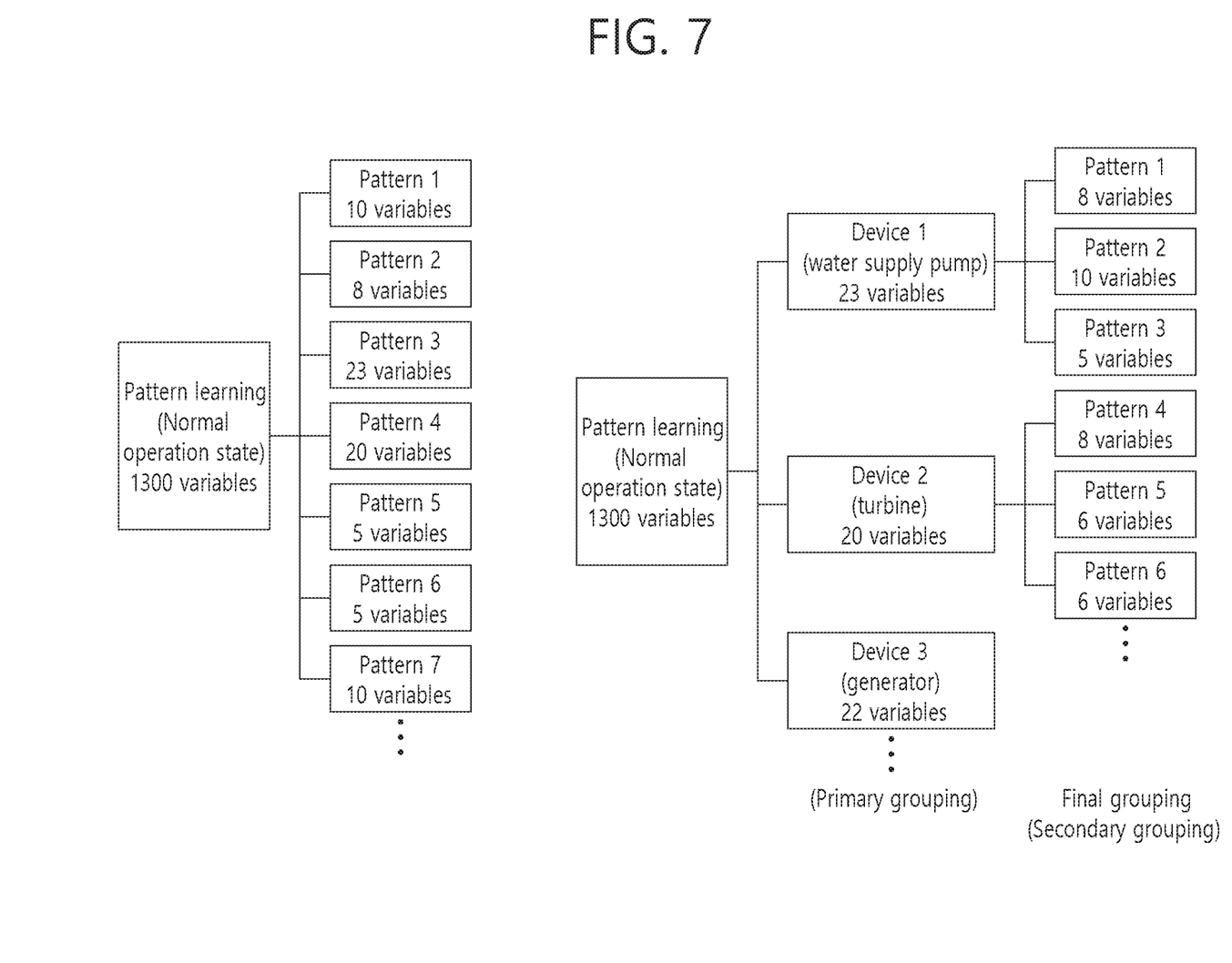
FIG. 7 is a diagram illustrating the conventional monitoring variable grouping method and a monitoring variable grouping method according to an embodiment of the present invention.

FIG. 7 is a diagram illustrating the conventional monitoring variable grouping method and a monitoring variable grouping method according to an embodiment of the present invention. Referring to FIG. 7, the conventional pattern learning group generation method shown in left side relates to a method of making a pattern learning group by pattern-learning total monitoring variable (about 1,300) data and categorizing the data for each pattern, and in the method, variables are categorized into the same pattern group only if the pattern is similar even though it is not the same device.

In this case, there is a problem that reliability and accuracy of pattern learning is degraded in some parts. For example, a problem may occur when temperature, pressure and rate of flow of a water supply pump and level of a power plant oil supply tank show a similar pattern for a year and grouped into a similar pattern group. It is reasonable that temperature, pressure and rate of flow of a water supply pump show a similar pattern in both of physical aspect and operation experience aspect, but these three variables above and the level of a power plant oil supply tank have no similarity in both of physical aspect and operation experience aspect. However, when the variables are grouped into the same pattern group simply because their patterns are similar, monitoring variables of the similar pattern group are influenced with each other when a prediction value is generated later, and accordingly, accuracy of a prediction value becomes deteriorated. In addition, in the case of the conventional method, when a current value is input, it needs to search whether there is a similar pattern for all targeted patterns targeted which are grouped in the similar pattern group, and accordingly, many times are consumed for analysis process. That is, it may be difficult to derive a result within a second or many computers are required therefor.

According to an embodiment of the present invention, in order to increase accuracy of a prediction value computation by increasing reliability of a pattern learning model, a grouping process of twice times is performed as shown in right side of FIG. 3. That is, in a primary grouping, first, all variables which are pattern learning subjects are categorized for each device, and in a secondary grouping, in the same device, variables showing a similar pattern are grouped.

When grouping is performed as described above, for example, when a current value is input, a variable is grouped into a device in which the current value belongs first, and a similar pattern is searched within the corresponding device. Accordingly, a time for searching a similar pattern decreases, and variables of which actual correlation is high are grouped and utilized for a prediction calculation, and accordingly, the accuracy becomes increased.

Referring to FIG. 6 again, the data processing device 210 transmits a currently measured variable values to the prediction value calculation device 250 and the early warning processing device 260 in real time (e.g., 1 second interval).

The prediction value calculation device 250 calculates a prediction value using the current values of the monitoring variables which are transmitted from the data processing device 210 in real time.

As algorithm for calculating the prediction value, for example, techniques such as Auto Associative Kernel Regression (AAKR) may be used. When the current values of the measured monitoring variables are input, a device to which the variable is belonged is recognized, and the values are compared with pattern learning values of the most similar pattern group among the grouped patterns of the corresponding device. A prediction value is calculated by providing a weight value for all related pattern models such as providing high weight value for the most similar pattern model and providing low weight value for the least similar pattern model. For example, a prediction value may be calculated by providing a weight value such that a summation of weight values for each of the related pattern models is 1 and added up.

The early warning processing device 260 calculates a residual by comparing the calculated prediction value with the current value.

A residual is calculated by using the calculated prediction value and Equation 1.

$$\text{Residual} = |\text{prediction value} - \text{current value}| \quad \text{[Equation 1]}$$

Next, the calculated residual is compared with a normal operation range residual of each monitoring variable stored in the normal operation range database 270, and when the calculated residual is greater than the normal operation range residual, an early warning is generated.

It may be configured that an early warning is generated when the calculated residual passes a deviation range (%) configured by an operator within a normal operation maximum value and minimum value range of each of the variables (i.e., the normal operation range residual). The normal operation range residual preconfigured by an operator is stored in the normal operation range database 270.

For example, the normal operation range of a water supply pump is 45 (minimum) to 55° C. (maximum) and a deviation between the minimum and the maximum value is 10° C. In the case that it is configured to generate a warning when a residual exceeds 30% of |maximum value−minimum value| deviation (i.e., 10° C.) of the normal operation range, for example, in the case that an input current value is 60° C. and a calculated prediction value is 52° C., a residual becomes 8° C., and then, a warning is generated. On the other hand, in the case that a current value is 430° C. and a prediction value is 45° C., a residual becomes 2° C., and then, a warning is not generated.

Figure 8:
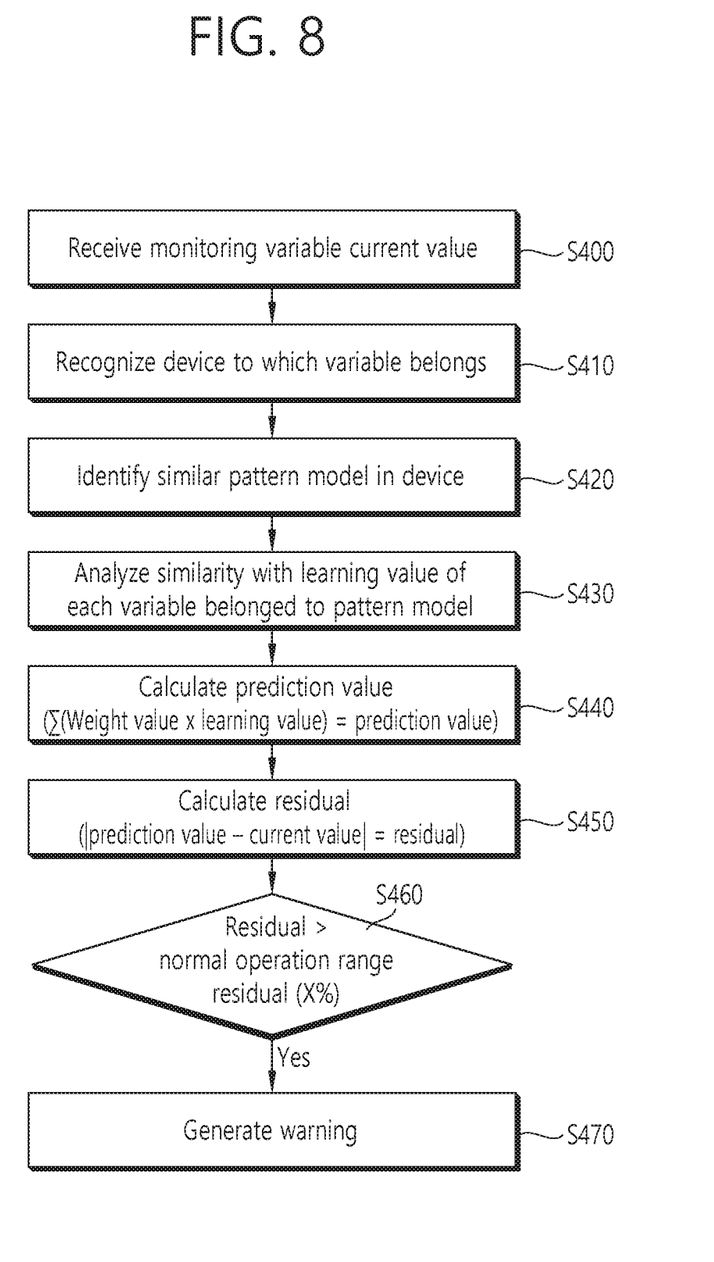
FIG. 8 is a flowchart illustrating a generation of early warning according to an embodiment of the present invention.

FIG. 8 is a flowchart illustrating a generation of early warning according to an embodiment of the present invention. Referring to FIG. 8, a prediction value calculation device 350 receives current values of monitoring signals after being converted to digital data in the data processing device 210 (step, S400).

Next, a device to which a monitoring variable of the current value is belonged is recognized (step, S410). That is, when the current value is a water supply pump bearing temperature value, the device to which the variable is belonged is recognized as a water supply pump.

Among the pattern models stored in the pattern database, similar pattern models are identified within the device to which the variable is belonged (step, S420).

When the similar pattern models are identified, a similarity between the learning value and the current value of each variable belonged thereto is analyzed (step, S430).

By providing high weight value for a pattern model of which similarity is high and providing low weight value for a pattern model of which similarity is low, as represented in Equation 2, a summation in which a weight value is multiplied to the learning value of each similarity pattern model is obtained as a prediction value (step, S440).

$$\Sigma(\text{weight value} \times \text{learning value}) = \text{prediction value} \quad \text{[Equation 2]}$$

(Herein, a summation of weight values is 1.)

The early warning processing device 260 receives the prediction value calculated in the prediction value calculation device 250 and the current value from the data processing device 210, and calculates a residual by using Equation 1 above.

Nest, the normal operation range residual for the corresponding monitoring variable stored in the normal operation range database 270 is compared with the residual (step, S460). When the calculated residual is greater than the normal operation range residual, a warning is generated (step, S470).

So far, various embodiments of the present invention are described. However, it is understood that the description is just for illustration and not to limit the scope of the present invention defined by the scope of the following claims. Accordingly, other embodiments are also within the scope of the following claims. For example, various modifications may be performed without departing from the scope of the present invention. Additionally, a part of the steps described above are independent from the order, and may be performed in different order from those of described above.

DESCRIPTION OF REFERENCE NUMERALS

100: measuring instrument 110: data processing device
120: early warning processing device 130: integrated center operator monitor
140: importance categorizing device 150: warning determination device
160: power plant operator computer 160 170: power plant operator personal wireless communication device
100-1: device normal operation period 110-1: MCR warning (based on configuration value)
120-1: transient state (early warning duration)
200: importance device in a nuclear power plant (including measuring instrument)
210: data processing device
220: monitoring variable selection/storage device 230: monitoring variable pattern learning device
240: pattern database 250: prediction value calculation device
260: early warning processing device 270: normal operation range database

The invention claimed is:

1. A method for early warning of an abnormality sign of a device, which includes device importance and warning validity determination, the method comprising:

a first step of determining, by an early warning processing device, whether a device monitoring signal value exceeds a normal operation range by using a weight value based on importance data for each monitoring variable which has been previously analyzed by an operator;
a second step of generating a warning, by the early warning processing device, when the device monitoring signal value exceeds the normal operation range; and
a third step of determining, by the warning determination device, whether the generated warning is a valid warning, which is subject to a warning analysis and to be traced.

2. The method for early warning of the abnormality sign of the device of claim 1, wherein the first step includes:
performing analogue-digital conversion, by a data processing device, of the monitoring signals received from measurement instruments; and calculating a current value of the monitoring signals and transmitting the current value to the early warning processing device and an importance categorizing device in a predetermined time interval.

3. The method for early warning of the abnormality sign of the device of claim 2, further comprising searching, by the importance categorizing device, an importance grade and the weight value of the monitoring variable to which the transmitted current value corresponds in an importance database, and transmitting the importance grade and the weight value to the early warning processing device.

4. The method for early warning of the abnormality sign of the device of claim 3, further comprising calculating, by the early warning processing device, a residual by using the transmitted current value, the weight value and a preconfigured pattern learning model.

5. The method for early warning of the abnormality sign of the device of claim 4, further comprising determining, by the early warning processing device, whether the residual passes the normal operation range which is preconfigured by an operator.

6. The method for early warning of the abnormality sign of the device of claim 1, wherein the third step includes receiving, by the warning determination device, current state information of the warning and categorizing the current state information into an announced warning and the warning to be analyzed.

7. The method for early warning of the abnormality sign of the device of claim 6, wherein the announced warning corresponds to at least one of a warning generated by power plant main control room, a warning generated by a device replacement operation, and a warning generated by an experiment or a maintenance scheduled in advance.

8. The method for early warning of the abnormality sign of the device of claim 6, if the warning is the warning be analyzed, when it is determined that a power plant maintenance is required as a result of the warning analysis and trace by the operator, wherein the warning determination device notices the generation of warning to at least one of a power plant operator computer and a power plant operator personal wireless communication device.

9. A system for early warning of an abnormality sign of a device, which includes device importance and warning validity determination, the system comprising:
an early warning processing device for determining whether a device monitoring signal value exceeds a normal operation range by using a weight value based on importance data for each monitoring variable which has been previously analyzed by an operator, and generating a warning when the device monitoring signal value exceeds the normal operation range; and
a warning determination device for determining whether the generated warning is a valid warning, which is subject to a warning analysis and to be traced.

10. The system for early warning of the abnormality sign of the device of claim 9, further comprising a data processing device for performing analogue-digital conversion of the monitoring signals received from measurement instruments, and calculating a current value of the monitoring signals and transmitting the current value to the early warning processing device and an importance categorizing device in a predetermined time interval.

11. The system for early warning of the abnormality sign of the device of claim 10, further comprising the importance categorizing device for searching an importance grade and a weight value of the monitoring variable to which the transmitted current value corresponds in an importance database, and transmitting the importance grade and the weight value to the early warning processing device.

12. The system for early warning of the abnormality sign of the device of claim 11, wherein the early warning processing device calculates a residual by using the transmitted current value, the weight value and a preconfigured pattern learning model.

13. The system for early warning of the abnormality sign of the device of claim 9, wherein the warning determination device receives current state information of the warning and categorizes the current state information into an announced warning and an warning be analyzed.

14. A method for early detection of an abnormality sign of a device of a nuclear power plant, the method comprising:
performing, by a pattern learning device, a pattern learning by using past device monitoring data of a predetermined period and grouping monitoring variables showing a similar pattern for a same device; and
generating, by a prediction value calculation device, a prediction value of a current monitoring data received in real time by using patterns of the grouped monitoring variables.

15. The method for early detection of the abnormality sign of the device of claim 14, wherein the step of grouping monitoring variables includes:
a first step of grouping the monitoring variables for each of same devices; and
a second step of grouping the grouped monitoring variables for each of the same devices showing the similar pattern.

16. The method for early detection of the abnormality sign of the device of claim 15, wherein the step of generating a prediction value calculates the prediction value by comparing the current monitoring data with a pattern learning value of the similar monitoring variable group belonged to the same device and providing a higher weight value as the more the current monitoring data are similar to the pattern learning value.

17. The method for early detection of the abnormality sign of the device of claim 14, wherein the past device monitoring data and the current monitoring data are digital data going through analogue-digital conversion.

18. The method for early detection of the abnormality sign of the device of claim 14, wherein the past device monitoring data and the current monitoring data are data related to early warning subject monitoring variable which is predetermined by an operator.

19. The method for early detection of the abnormality sign of the device of claim 14, further comprising generating, by an early warning processing device, an early warning by obtaining a residual using an absolute value of a difference between the prediction value and the current data, when the residual is greater than a normal operation range residual.

20. The method for early detection of the abnormality sign of the device of claim 19, wherein the normal operation range residual is stored in database, which is designated in advance for each monitoring variable by an operator.

* * * * *